(12) United States Patent
Wan et al.

(10) Patent No.: US 9,107,160 B2
(45) Date of Patent: Aug. 11, 2015

(54) UPLINK SYNCHRONIZATION METHOD AND APPARATUS

(75) Inventors: Lei Wan, Beijing (CN); Yongxia Lv, Beijing (CN); Yunzhe Hou, Shenzhen (CN)

(73) Assignee: Huawei Technolgoies Co., Ltd., Shenzhen (CN)

( * ) Notice: Subject to any disclaimer, the term of this patent is extended or adjusted under 35 U.S.C. 154(b) by 230 days.

(21) Appl. No.: 13/279,972

(22) Filed: Oct. 24, 2011

(65) Prior Publication Data

US 2012/0087270 A1 Apr. 12, 2012

Related U.S. Application Data

(63) Continuation of application No. PCT/CN2009/071439, filed on Apr. 24, 2009.

(51) Int. Cl.
*H04W 56/00* (2009.01)
*H04W 36/00* (2009.01)

(52) U.S. Cl.
CPC ................. *H04W 56/0045* (2013.01)

(58) Field of Classification Search
USPC ........... 370/235, 328, 329, 331, 350; 455/432.1, 436, 440, 444
See application file for complete search history.

(56) References Cited

U.S. PATENT DOCUMENTS

| | | | |
|---|---|---|---|
| 5,711,003 A | 1/1998 | Dupuy | |
| 5,966,670 A | 10/1999 | Keskitalo et al. | |
| 6,633,559 B1 * | 10/2003 | Asokan et al. | 370/350 |
| 7,573,913 B2 * | 8/2009 | Terry | 370/509 |
| 8,767,585 B2 * | 7/2014 | Pelletier et al. | 370/254 |
| 8,837,439 B2 * | 9/2014 | Ahn et al. | 370/336 |
| 2004/0151143 A1 | 8/2004 | Abdesselem et al. | |
| 2009/0029715 A1 * | 1/2009 | Burchardt | 455/456.1 |
| 2009/0046672 A1 * | 2/2009 | Malladi et al. | 370/336 |
| 2009/0215459 A1 * | 8/2009 | Kuo | 455/436 |
| 2010/0238908 A1 * | 9/2010 | Wu | 370/336 |

(Continued)

FOREIGN PATENT DOCUMENTS

| | | |
|---|---|---|
| CN | 1457155 A | 11/2003 |
| CN | 1728599 A | 2/2006 |
| CN | 101132228 A | 2/2008 |

(Continued)

OTHER PUBLICATIONS

Extended European Search Report issued in corresponding European Patent Application No. 09843536.5, mailed Jun. 6, 2012.
Huawei, "Issues in Carrier Aggregation" Agenda Item 15.4, 3GPP TSG RAN WG1 Meeting #57bis. Los Angeles, California, Jun. 29-Jul. 3, 2009. R1-092377.

(Continued)

*Primary Examiner* — Ahmed Elallam
(74) *Attorney, Agent, or Firm* — Brinks Gilson & Lione

(57) ABSTRACT

Embodiments of the present invention relates to an uplink synchronization method and apparatus, where the method includes: obtaining a timing advance of a second frequency point according to a timing advance of a first frequency point; and sending data at an uplink sending time corresponding to the timing advance of the second frequency point. According to embodiments of the present invention, the TA of the second frequency point can be obtained according to the TA of the first frequency point, and a RACH access process does not need to be performed at the second frequency point, which effectively reduces the network resources occupied by the RACH process, and shortens the produced delay, thereby improving the performance of the entire system.

7 Claims, 7 Drawing Sheets

(56) References Cited

U.S. PATENT DOCUMENTS

2010/0254356 A1* 10/2010 Tynderfeldt et al. .......... 370/336
2011/0051633 A1* 3/2011 Pan et al. ...................... 370/280

FOREIGN PATENT DOCUMENTS

| CN | 101370267 A | 2/2009 | |
|---|---|---|---|
| CN | 101388722 A | 3/2009 | |
| RU | 2302090 C2 | 6/2007 | |
| WO | WO 2009061256 A1 * | 5/2009 | ............ H04W 74/08 |

OTHER PUBLICATIONS

Office Action issued in corresponding Chinese Patent Application No. 2009801225654, mailed Mar. 5, 2013.
Office Action (including English translation) issued in corresponding Russian Patent Application No. 2011147723/07(071560); dated Feb. 4, 2013.
International Search Report and Written Opinion of the International Searching Authority issued in corresponding PCT Patent Application No. PCT/CN2009/071439, mailed Jan. 28, 2010.

* cited by examiner

UPLINK SYNCHRONIZATION METHOD AND APPARATUS

CROSS-REFERENCE TO RELATED APPLICATIONS

This application is a continuation of International Application No. PCT/CN2009/071439, filed on Apr. 24, 2009, which is hereby incorporated by reference in this entirety.

FIELD OF THE INVENTION

Embodiments of the present invention relates to the field of communications technologies, and in particular, to an uplink synchronization method and apparatus.

BACKGROUND OF THE INVENTION

In the 3rd generation partnership project (3GPP), the uplink synchronization technology in the long term evolution (Long Term Evolution, hereafter referred to as LTE) system includes two parts as follows: In one part, a user equipment (User Equipment, hereafter referred to as UE) needs to obtain uplink synchronization again after losing the uplink synchronization. Specifically, the UE sends a random access channel (Random Access Channel, hereafter referred to as RACH) preamble (preamble) to a base station; the base station obtains a time advance (Timing Advance, hereafter referred to as TA) of initialized uplink synchronization of the UE uplink carrier according to the received RACH preamble; then, the base station sends the TA to the UE; and the UE obtains an uplink sending time according to the TA. As a result, the initialized uplink synchronization is implemented. In the other part, the UE needs to maintain the uplink synchronization in an uplink synchronization state. Specifically, the UE sends a reference symbol (Reference Symbol, hereafter referred to as RS) to the base station, and the RS includes sounding reference symbol (Sounding Reference Symbol, hereafter referred to as SRS) and demodulation reference symbol (Demodulation Reference Symbol, hereafter referred to as DMRS); the base station obtains, according to the received RS, the TA that is needed by the UE to maintain the uplink synchronization; then, the base station sends the TA to the UE; and the UE obtains an uplink sending time according to the TA. As a result, the uplink synchronization is maintained.

In the case of carrier aggregation of multiple uplink members, hetero-frequency switchover in the same system, hetero-frequency switchover in different systems, or loss of synchronization, the UE needs to perform a RACH access process. The case of the carrier aggregation of multiple uplink members is taken as an example. During an initialized access process, the UE can only perform the RACH access process on a certain uplink member carrier (for example, carrier f1) to obtain the TA of carrier f1. Before the UE needs to send data on another uplink member carrier (for example, carrier f2), the UE needs to obtain the uplink synchronization of the carrier f2 first, and also needs to perform the RACH access process on the carrier f2. That is to say, the UE needs to perform the RACH access process on each uplink member carrier, so as to obtain the initialized uplink synchronization. In the same way, the UE also needs to send the RS on N different uplink member carriers to maintain the uplink synchronization, then, the base station obtains N TAs, and needs to maintain the N TAs, and then, sends the N TAs to the UE.

In the case of the forgoing carrier aggregation, when the RACH preamble is sent once, it takes at least 8 ms for the UE to obtain the TA; when the RACH preamble is repeatedly sent for n times, it takes at least 8 n ms for the UE to obtain the n TAs. For some services which are sensitive to a delay, the delay in this processing method is too long, and occupies certain network resources, reducing the performance of a system. Meanwhile, in an uplink synchronization maintenance stage, the base station needs to maintain multiple TAs, and send the multiple TAs to the UE, which is a waste of network resources. In the same way, in the case of the hetero-frequency switchover in the same system, hetero-frequency switchover in different systems, or loss of synchronization, when the UE performs a RACH access process, the problem that the delay is too long and the network resources are wasted may exist.

SUMMARY OF THE INVENTION

Embodiments of the present invention provide an uplink synchronization method and apparatus to reduce a delay and improve the performance of a system.

An embodiment of the present invention provides an uplink synchronization method, including:

obtaining a timing advance of a second frequency point according to a timing advance of a first frequency point; and sending data at an uplink sending time corresponding to the timing advance of the second frequency point.

An embodiment of the present invention provides an uplink synchronization apparatus, including:

a first obtaining module, configured to obtain a timing advance of a second frequency point according to a timing advance of a first frequency point; and a sending module, configured to send data at an uplink sending time corresponding to the timing advance of the second frequency point.

According to the embodiments of the present invention, the TA of the second frequency point may be obtained according to the TA of the first frequency point, and a RACH access process does not need to be performed at the second frequency point, which effectively reduces the network resources occupied by the RACH process, and shortens the produced delay, thereby improving the performance of the entire system.

DETAILED DESCRIPTION OF THE EMBODIMENTS

The following describes the technical solutions of the present invention in further detail with reference to the accompanying drawings and embodiments.

Figure 1:
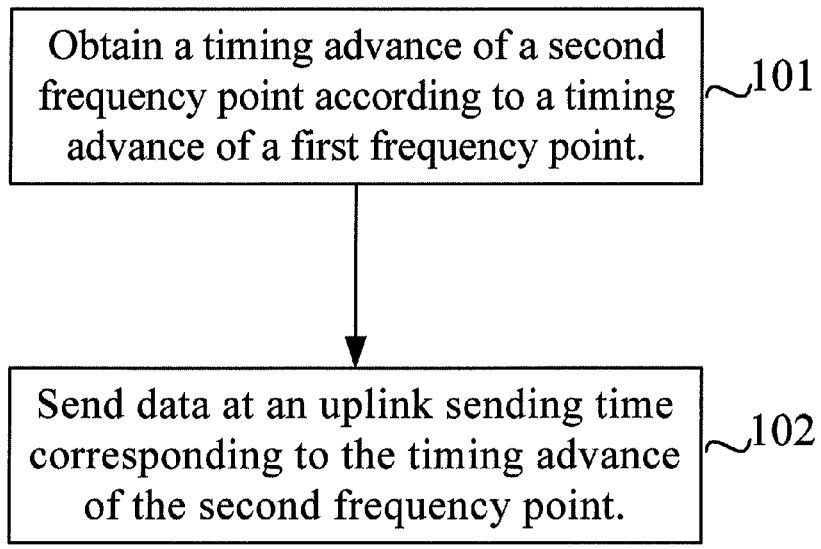
FIG. 1 is a flow chart of an uplink synchronization method according to Embodiment 1 of the present invention.

FIG. 1 is a flow chart of an uplink synchronization method according to Embodiment 1 of the present invention. As shown in FIG. 1, the embodiment specifically includes the following steps.

Step 101: Obtain a timing advance of a second frequency point according to a timing advance of a first frequency point.

Step 102: Send data at an uplink sending time corresponding to the timing advance of the second frequency point.

According to the embodiment of the present invention, the TA of the second frequency point may be obtained according to the TA of the first frequency point, and a RACH access process does not need to be performed at the second frequency point, which effectively reduces the network resources occupied by the RACH process, and shortens the produced delay, thereby improving the performance of the entire system.

Figure 2:
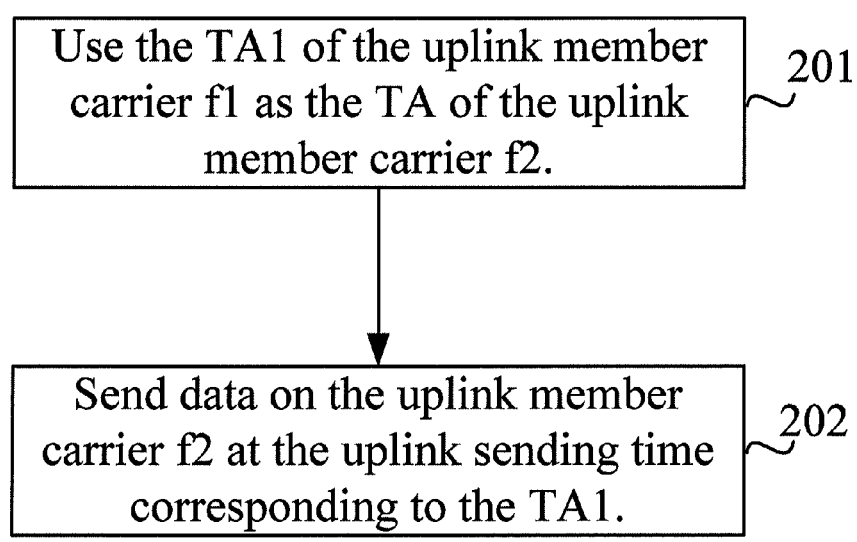
FIG. 2 is a flow chart of an uplink synchronization method according to Embodiment 2 of the present invention.

FIG. 2 is a flow chart of an uplink synchronization method according to Embodiment 2 of the present invention. This embodiment is applicable to the case of the carrier aggregation of multiple uplink members. Specifically, during an initialized access process, the UE perform a RACH access process on an uplink member carrier f1 (whose frequency point is f1 that is used as a first frequency point), to obtain a TA of the uplink member carrier f1, which is recorded as TA1. When the base station needs to schedule the UE to send data on another uplink member carrier f2 (whose frequency point is f2 that is used as a second frequency point), the following steps shown in FIG. 2 are performed.

Step 201: Use the TA1 of the uplink member carrier f1 as the TA of the uplink member carrier f2.

Step 202: Send data on the uplink member carrier f2 at the uplink sending time corresponding to the TA1.

That is to say, the TA of the frequency point f2 is equal to the TA1 of the frequency point f1. The UE does not need to perform the RACH access on the uplink member carrier f2 to obtain the TA, and after the TA1 of the uplink member carrier f1 is used as the TA of the uplink member carrier f2, data is directly sent on the uplink member carrier f2 according to the TA1 of the uplink member carrier f2, which effectively reduces the network resources occupied by the RACH access process, and shortens the produced delay, thereby improving the performance of the entire system.

In the wireless mobile communication, signal may encounter many buildings, trees, and rugged terrains during transmission, which may causes energy absorption, and electric wave diffraction and scattering. Therefore, the mobile communication channel is a communication environment full of the emitted waves. The signals arriving at mobile station antennas are not from a single path, but are the synthesis signals of the multiple emitted waves from multiple paths.

Figure 3:
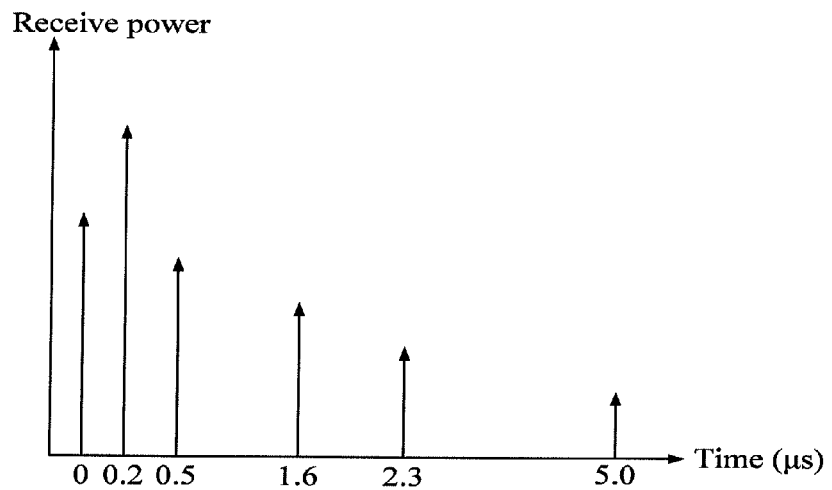
FIG. 3 is a schematic diagram of a relationship between a signal multi-path delay and receive power in an uplink synchronization method according to Embodiment 2 of the present invention.

FIG. 3 is a schematic diagram of a relationship between a signal multi-path delay and receive power in an uplink synchronization method according to Embodiment 2 of the present invention. As shown in FIG. 3, because the distances when the electric wave passes through paths are different, the arrival time of emitted waves from the paths is different, and the phases are also different, and the receive power from the paths in multi-path signals in different phases is different.

Figure 4A:
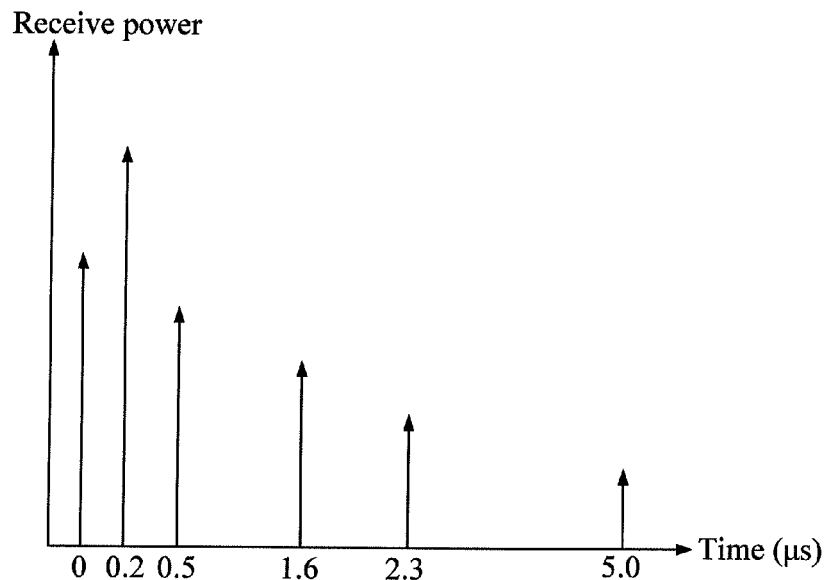
FIG. 4A and FIG. 4B are schematic diagrams of relationships between multi-path delays and receive power of signals sent from a same position but at different frequency points in an uplink synchronization method according to Embodiment 2 of the present invention.
Figure 4B:
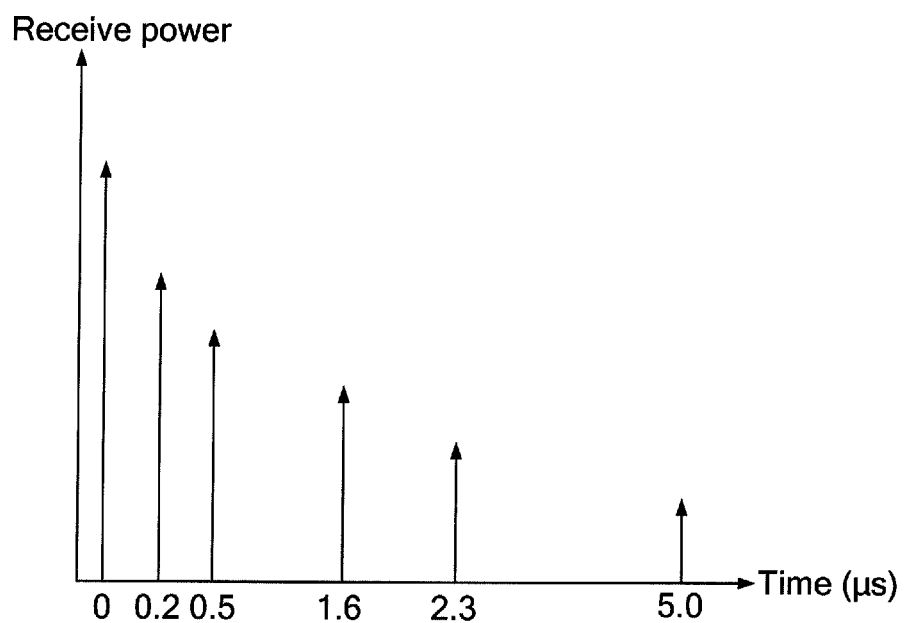

An absolute delay of each path is equal to a transmission distance of each path divided by light velocity, and the transmission distance of each path mainly depends on the distance between a base station and a mobile station, emitting materials around and the terrain, and has nothing to do with the frequency point. That is to say, during a transmission process of signals at different frequency points in a same mobile station, a delay corresponding to each multi-path arriving at the base station is the same. FIG. 4A and FIG. 4B are schematic diagrams of relationships between signal multi-path delays and receive power of signals sent from a same position but at different frequency points in an uplink synchronization method according to Embodiment 2 of the present invention. FIG. 4A shows frequency point f1, and FIG. 4B shows frequency point f2. As shown in FIG. 4A and FIG. 4B, the delay of a first path of f1 and the delay of a first path of f2 are the same, and both are 0.2 μs. However, during a transmission process of signals at different frequency points in a same mobile station, signals may experience different attenuations. The transmit power is the same and the receive power is different, that is, the situation shown in FIG. 4A and FIG. 4B may occur. Even though the position of the mobile station is unchanged, the delays of the signals corresponding to strongest paths at different frequency points are different. The delay of the signal corresponding to a strongest path at the frequency point f1 is 0.2 μs, and the delay of the signal corresponding to a strongest path at the frequency point f2 is 0 μs.

However, generally, the difference between the delays of signals corresponding to two strongest paths at two frequency points at the same position does not exceed the average delay difference. For example, the delay difference of the common urban area is about 5 μs. Definitely, a case where delays of a signal corresponding to a strongest paths at different frequency points are the same also exists. When the base station calculates the TA of the mobile station, reference can be made to either the first path or the signal-strongest path. If the base station determines the TA according to the first path, the TAs that are corresponding to two frequency points and are sent from the base station to the mobile station are the same. If the base station determines the TA according to the signal-strongest path, the TAs that are corresponding to two frequency points and are sent from the base station to the mobile station may be the same, or may be different; however, may be slightly different. A cyclic prefix of the existing LTE system is 4.7 μs, and the value of the difference between TAs at two frequency points is very close to the cyclic prefix of the LTE system. Such a difference has little influence on the performance of a system. Therefore, as for different frequency points f1 and f2 in a same mobile station, f2 may use the TA of f1.

Based on the forgoing analysis, in the case of the carrier aggregation of multiple uplink members, the UE does not need to perform a RACH access on the uplink member carrier f2, and sends data on the uplink member carrier f2 directly according to the TA1 of the uplink member carrier f1, which effectively reduces the network resources occupied by the RACH process, and shortens the produced delay, thereby improving the performance of the entire system.

In the same way, in an uplink synchronization maintenance stage, the base station needs to maintain only one TA and send the TA to the UE, and then, the UE uses the same TA on all uplink member carriers, which saves the network resources.

Figure 5:
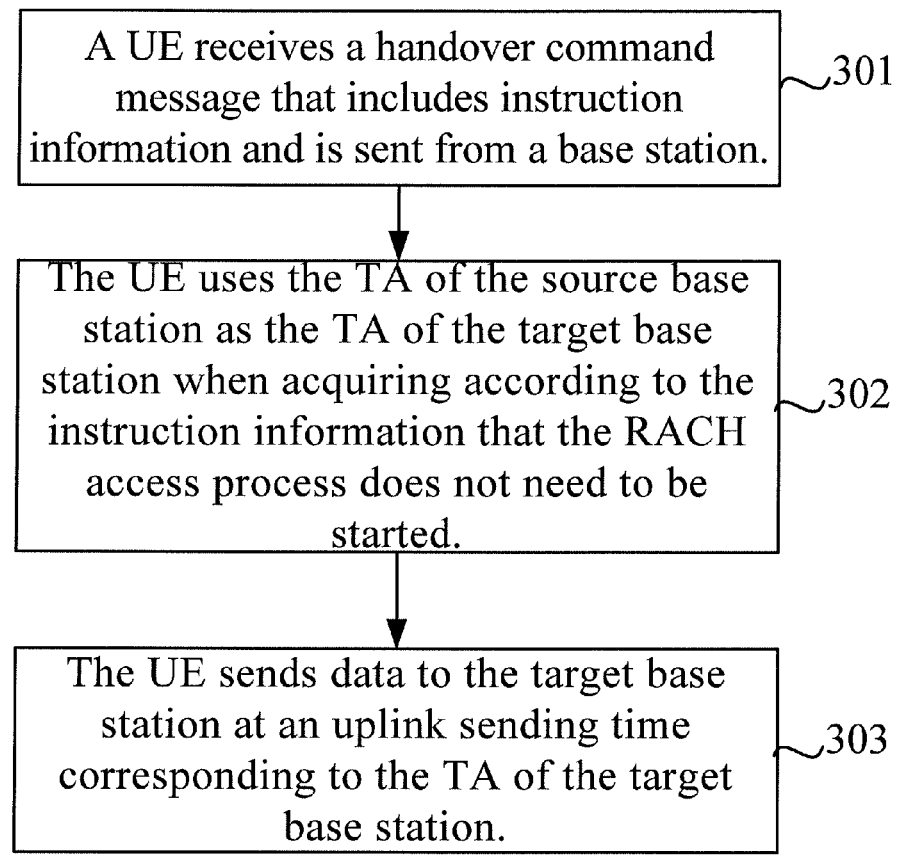
FIG. 5 is a flow chart of an uplink synchronization method according to Embodiment 3 of the present invention.

FIG. 5 is a flow chart of an uplink synchronization method according to Embodiment 3 of the present invention. This embodiment is applicable to the hetero-frequency switchover process in a same system or in different systems in the case where the UEs share a same station address or the distance between the station addresses is relatively short (shorter than 10 m), or a base band unit (Base Band Unit, hereafter referred to as BBU) is shared. In addition, during the switchover process, hetero-frequency remote radio units (Remote Radio Units, hereafter referred to as RRUs) are synchronized or the source base station and the target base station are synchronized. This embodiment takes a switchover process between a source base station and a target base station as an example for illustration. The switchover between the RRUs is similar thereto. As for the switchover process between the source base station and the target base station, the source base station is a first base station, and the frequency point of the source base station is a first frequency point; the target base station is a second base station, and the frequency point of the target base station is a second frequency point.

As shown in FIG. 5, this embodiment specifically includes the following steps.

Step 301: A UE receives a handover command message that includes instruction information and is sent from a source base station, where the instruction information is used to instruct the UE to start a RACH access process or not.

Step 302: When The UE acquires, according to the instruction information, that the RACH access process does not need to be started, the UE uses a TA provided by the source base station as the TA of the target base station.

Step 303: The UE sends data to the target base station at an uplink sending time corresponding to the TA of the target base station.

If the instruction information received by the UE instructs the UE to start the RACH access process, the UE obtains the TA from the target base station by sending a RACH preamble.

When this embodiment applies to hetero-frequency switchover processes in different systems, if precision of the timing estimation in different systems is different, this embodiment may further include: the source base station sends a notification message to the UE to instruct the UE to reserve a delay when accessing the target base station, so as to ensure that the time when the data sent from the UE arrives at the target base station falls within the time window of the target base station at the second frequency point. The reserved delay may be a fixed value defined in the standard, for example, wide band code division multiple access (Wide Band Code Division Multiple Access, hereafter referred to as WCDMA)—LTE, LTE-WCDMA, or time division-synchronous code division multiple access (Time Division-Synchronous Code Division Multiple Access, hereafter referred to as TD-SCDMA) to LTE; or the reserved delay is notified to the UE by the base station through signaling.

As for the hetero-frequency switchover process in the same system or in different systems in the case where the UEs share the same station address or the distance between the station addresses is short, or a BBU is shared, the UE does not need to perform a RACH access process at the second frequency point, and may send the data to the target base station at an uplink sending time corresponding to the TA of the first frequency point, which effectively reduces the network resource occupied by the RACH process, and shortens the produced delay, thereby improving the performance of the entire system. In the same way, in an uplink synchronization maintenance stage, the base station needs to maintain only one TA and send the TA to the UE, and then, the UE obtains TAs of other uplink member carriers according to this TA, which saves the network resources.

Figure 6:
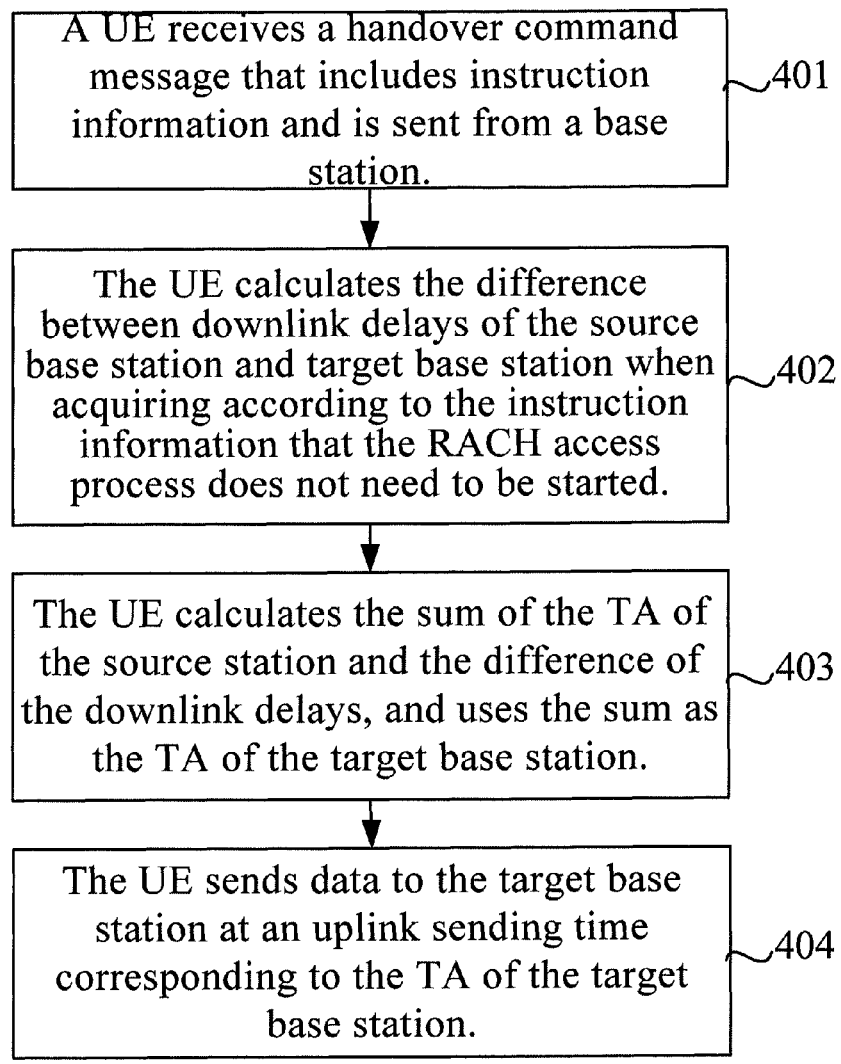
FIG. 6 is a flow chart of an uplink synchronization method according to Embodiment 4 of the present invention.

FIG. 6 is a flow chart of an uplink synchronization method according to Embodiment 4 of the present invention. This embodiment is applicable to a hetero-frequency switchover process in a same system or in different systems in the case where the UEs do not share a same station address or the distance between the station addresses is relatively long (much longer than 10 m), or a BBU is not shared. During the switchover process, hetero-frequency RRUs may be synchronized or desynchronized, or a source base station and a target station may be synchronized or desynchronized. This embodiment may also be applicable to the hetero-frequency switchover process in the same system or in different systems in the case where the UEs share the same station address or the distance between the station addresses is relatively short (shorter than 10 m), or a BBU is shared, and the hetero-frequency RRUs are desynchronized or a source base station and a target station are desynchronized. This embodiment takes a switchover process between a source base station and a target base station as an example for illustration. The switchover between the RRUs is similar thereto. As for the switchover process between the source base station and the target base station, the source base station is a first base station, and the frequency point of the source base station is a first frequency point; the target base station is a second base station, and the frequency point of the target base station is a second frequency point.

As shown in FIG. 6, this embodiment specifically includes the following steps.

Step 401: A UE receives a handover command message that includes instruction information and is sent from a base station, where the instruction information is used to instruct the UE to start a RACH access process or not.

Step 402: When the UE acquires, according to the instruction information, that a RACH access process does not need to be started, the UE measures the difference between downlink delays of a source base station and a target base station.

Step 403: The UE calculates a sum of the TA provided by the source base station and the difference between the downlink delays, and uses the sum as the TA of the target base station.

Step 404: The UE sends data to the target base station at an uplink sending time corresponding to the TA of the target base station.

If the instruction information received by the UE instructs the UE to start the RACH access process, the UE obtains the TA from the target base station by sending a RACH preamble.

Further, the forgoing step 402 may be specifically: assume that the arrival time that is of a downlink signal sent by the source base station through a downlink carrier and is measured by the UE at time n (a first time) is T1, and the arrival time that is of the downlink signal sent by the target station through the downlink carrier and is measured by the UE at time n+k (a second time) is T2, the downlink delay difference is obtained according to T1, T2 and the sub-frame length. Specifically, the difference between downlink delays of the source base station and the target base station is $$(T2-T1)\% \ T_{subframe}$$

(% is the remainder), where $T_{subframe}$ represents the subframe length. Assume that the TA value of the source base station is TA1 and the TA value of the target base station is TA2, where $$TA2=TA1+(T2-T1)\% \ T_{subframe}$$

is obtained in the step 403.

Optionally, the arrival time that is of the downlink signal sent by the source base station or the target base station through the downlink carrier and is measured by the UE may be the arrival time of the first path.

When this embodiment applies to the hetero-frequency switchover process in different systems, if precision of the timing estimation in different systems is different, this embodiment may further include: the source base station sends a notification message to the UE to instruct the UE to reserve a delay when accessing the target base station, so as to ensure that the time when the data sent from the UE arrives at the target base station falls within the time window of the target base station at the second frequency point. The reserved delay may be a fixed value defined in the standard, for example, WCDMA-LTE, LTE-WCDMA, or TD-SCDMA to LTE; or the reserved delay may be notified to the UE by the base station through signaling.

As for the case that this embodiment is applicable to, the UE does not need to perform a RACH access process at the second frequency point, and may send data to the target base station at the uplink sending time corresponding to the sum of the TA of the first frequency point and the difference between the downlink delays, which effectively reduces the network resources occupied by the RACH process, and shortens the produced delay, thereby improving the performance of the entire system. In the same way, in an uplink synchronization maintenance stage, the base station needs to maintain only one TA and send the TA to the UE. In this way, the UE obtains TAs of other uplink member carriers according to this TA, which saves the network resources.

Figure 7:
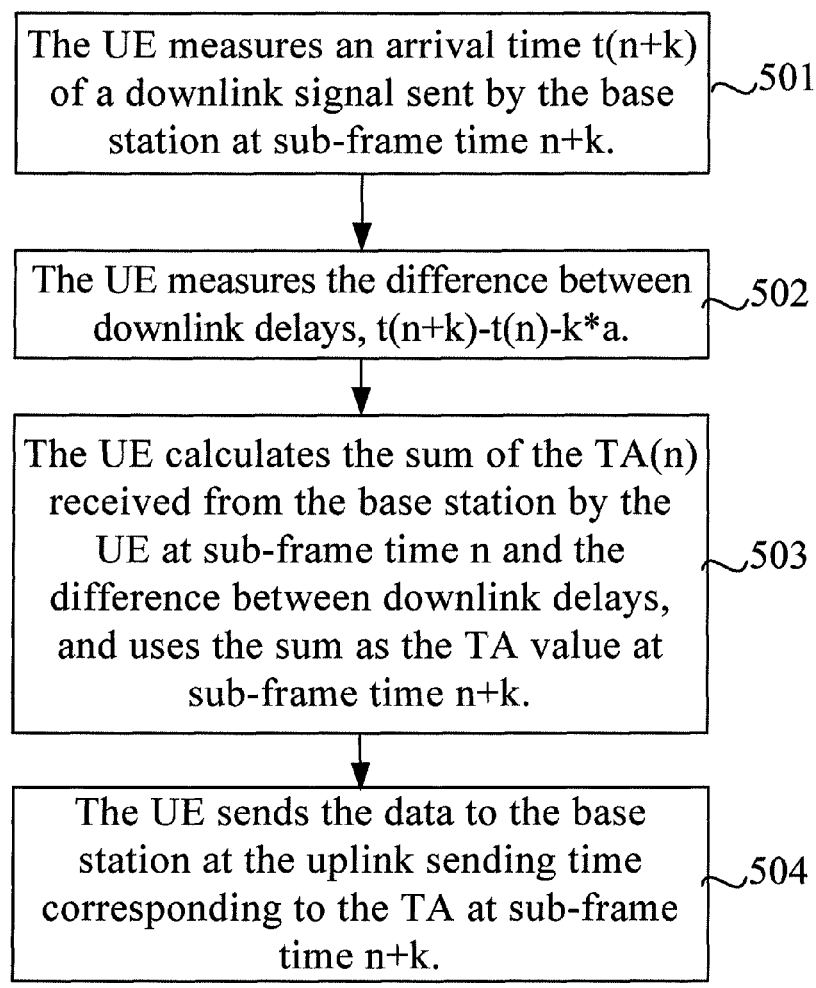
FIG. 7 is a flow chart of an uplink synchronization method according to Embodiment 5 of the present invention.

FIG. 7 is a flow chart of an uplink synchronization method according to Embodiment 5 of the present invention. This embodiment is applicable to a frequency division duplex (Frequency Division Duplex, hereafter referred to as FDD) system, a case of high speed, or a random access process when the UE works in a discontinuous receiving mode after losing the synchronization. Specifically, the UE does not lose the synchronization at sub-frame time n (a first time), and receives the TA sent by the base station, assume that the TA value is TA(n). Furthermore, the UE measures the arrival time, recoded as t(n), of a downlink signal sent by the base station at sub-frame time n. Assume that the UE loses the synchronization at sub-frame time n+k (a second time). In this case, the following steps shown in FIG. 7 are performed.

Step 501: The UE measures an arrival time of a downlink signal sent by a base station at sub-frame time n+k, where the arrival time is recorded as t(n+k).

Step 502: The UE measures the difference between downlink delays, t(n+k)−t(n)−k*a, where a is the sub-frame length.

Step 503: The UE calculates a sum of the TA(n) received from the base station by the UE at sub-frame time n and the difference between downlink delays, that is, TA(n)+t(n+k)−t(n)−k*a, which is used as the TA value at sub-frame time n+k.

Step 504: The UE sends data to the base station at an uplink sending time corresponding to the TA at sub-frame time n+k.

As for the case that this embodiment applies to, the UE does not need to perform a RACH access process when losing the synchronization, and may send data to the base station at the uplink sending time corresponding to the sum of the TA when the synchronization is not lost and the difference between the downlink delays, which effectively reduces the network resources occupied by the RACH process, and shortens the produced delay, thereby improving the performance of the entire system. In the same way, in an uplink synchronization maintenance stage, the base station needs to maintain only one TA and send the TA to the UE, and then, according to this TA, the UE obtains TAs of the sub-frames after the UE loses synchronization, which saves the network resources.

Figure 8:
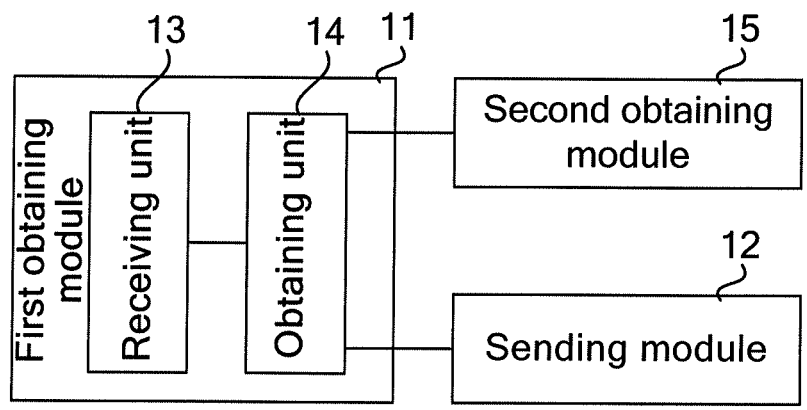
FIG. 8 is a schematic structure diagram of an uplink synchronization apparatus according to an embodiment of the present invention.

FIG. 8 is a schematic structure diagram of an uplink synchronization apparatus according to an embodiment of the present invention. As shown in FIG. 8, this embodiment specifically includes: a first obtaining module 11 and a sending module 12, where the first obtaining module 11 is configured to obtain a timing advance of a second frequency point according to a timing advance of a first frequency point; and the sending module 12 is configured to send data at an uplink sending time corresponding to the timing advance of the second frequency point.

Further, the first obtaining module 11 includes a receiving unit 13 and an obtaining unit 14. The receiving unit 13 is configured to receive a handover command message that includes instruction information and is sent from a first base station, where the instruction information is used to instruct whether to start a random access process; and the obtaining unit 14 is configured to obtain the timing advance of the second frequency point according to the timing advance of the first frequency point when acquiring, according to the instruction information, that the random access process does not need to be started.

The first obtaining module 11 or obtaining unit 14 is specifically configured to use the timing advance of the first frequency point as the timing advance of the second frequency point, or calculate the sum of the timing advance of the first frequency point and the difference between uplink delays of the first and second frequency points and use the sum as the timing advance of the second frequency point.

This embodiment may further include a second obtaining module 15, where the second obtaining module 15 is configured to: obtain downlink delay difference according to the arrival time of a downlink signal sent by the first base station at a first sending time and the arrival time and sub-frame length of a downlink signal sent by the second base station at a second sending time; or obtain downlink delay difference according to the arrival time of a downlink signal sent by the base station at a first sending time, and the arrival time and sub-frame length of a downlink signal sent by the base station at a second sending time.

According to embodiments of the present invention, the TA of the second frequency point can be obtained according to the TA of the first frequency point, and the RACH access process does not need to be performed at the second frequency point, which effectively reduces the network resources occupied by the RACH process, and shortens the produced delay, thereby improving the performance of the entire system.

Persons of ordinary skill in the art may understand that all or part of steps according to the embodiments of the present invention may be implemented by a program instructing relevant hardware. The programs may be stored in a computer readable storage medium. When the programs are executed, the steps of the method in the embodiment are performed. The storage medium includes various mediums, such as ROM, a RAM, a magnetic disk or a compact disk, which may store program code.

Finally, it should be noted that the above embodiments are merely used to illustrate the technical solutions in the embodiments of the present invention. The technical solutions of the present invention are not limited thereto. Although the present invention is described in detail with reference to the exemplary embodiments, persons of ordinary in the art should understand that: various modifications or equivalent replacements still can be made to the technical solutions in the forgoing embodiments without departing from the spirit and principle of the present invention, and such modifications and equivalent replacements should fall into the principle and protection scope of the invention.

The invention claimed is:

1. An uplink synchronization method comprising:
obtaining a first timing advance of a first carrier according to a random access channel (RACH) or a reference symbol (RS) in the first carrier;

obtaining a second timing advance of a second carrier according to the first timing advance wherein an initial RACH access process does not need to be performed at the second carrier;

sending data in the second carrier at an uplink sending time corresponding to the second timing advance;

wherein the second timing advance of the second carrier is equal to the first timing advance of the first carrier; or wherein the second timing advance of the second carrier is a sum of the first timing advance of the first carrier and the difference between downlink delays of the first and second carriers.

2. The method according to claim 1, wherein the second timing advance corresponds to the second carrier and the obtaining the second timing advance of the second carrier according to the first timing advance of the first carrier comprises:

receiving a handover command message that comprises instruction information and is sent from a first base station, wherein the instruction information is used to instruct whether to start a random access process; and obtaining the second timing advance of the second carrier according to the first timing advance of the first carrier when, according to the instruction information, the random access process does not need to be started.

3. The method according to claim 1, wherein before obtaining the second timing advance according to the timing advance of the first carrier, the method further comprises one of:

obtaining the difference between the downlink delays according to the arrival time of a downlink signal sent by a first base station at a first sending time and the arrival time and sub-frame length of a downlink signal sent by a second base station at a second sending time; or obtaining the difference between the downlink delays according to the arrival time of a downlink signal sent by a base station at a first sending time and the arrival time and sub-frame length of a downlink signal sent by the base station at a second sending time.

4. An uplink synchronization apparatus comprising:

a transmitter, configured to send a random access channel (RACH) preamble in a first carrier by user equipment during a RACH access process;

processor configured to:

obtain a first timing advance of the first carrier according to a random access channel (RACH) or a reference symbol (RS) in the first carrier;

obtain a second timing advance of a second carrier according to the first timing advance wherein an initial RACH access process does not need to be performed at the second carrier;

a transmitter, configured to send data in the second carrier at an uplink sending time corresponding to the second timing advance;

wherein the second timing advance of the second carrier is equal to the first timing advance of the first carrier; or wherein the second timing advance of the second carrier is a sum of the first timing advance of the first carrier and the difference between downlink delays of the first and second carriers.

5. The apparatus according to claim 4, wherein the second timing advance corresponds to the second carrier and the processor is specifically configured to:

receive a handover command message that comprises instruction information and is sent from a first base station, wherein the instruction information is used to instruct whether to start the random access process; and obtain the second timing advance of the second carrier according to the timing advance of the first carrier when, according to the instruction information, the random access process does not need to be started.

6. The apparatus according to claim 4, wherein the processor is further configured to:

obtain a difference between downlink delays according to the arrival time of a downlink signal sent by a first base station at a first sending time and the arrival time and sub-frame length of a downlink signal sent by a second base station at a second sending time; or obtain a difference between downlink delays according to the arrival time of a downlink signal sent by a base station at a first sending time and the arrival time and sub-frame length of a downlink signal sent by a base station at a second sending time.

7. A non-transitory computer-readable media comprising computer executable instructions, wherein the computer executable instructions, when executed by a processor, perform the steps of:

obtaining a first timing advance of a first carrier according to a random access channel (RACH) or a reference symbol (RS) in the first carrier;

obtaining a second timing advance of a second carrier according to the first timing advance wherein an initial RACH access process does not need to be performed at the second carrier;

sending data in the second carrier at an uplink sending time corresponding to the second timing advance;

wherein the second timing advance of the second carrier is equal to the first timing advance of the first carrier; or wherein the second timing advance of the second carrier is a sum of the first timing advance of the first carrier and the difference between down link delays of the first and second carriers.

* * * * *